United States Patent Office 3,128,611
Patented Apr. 14, 1964

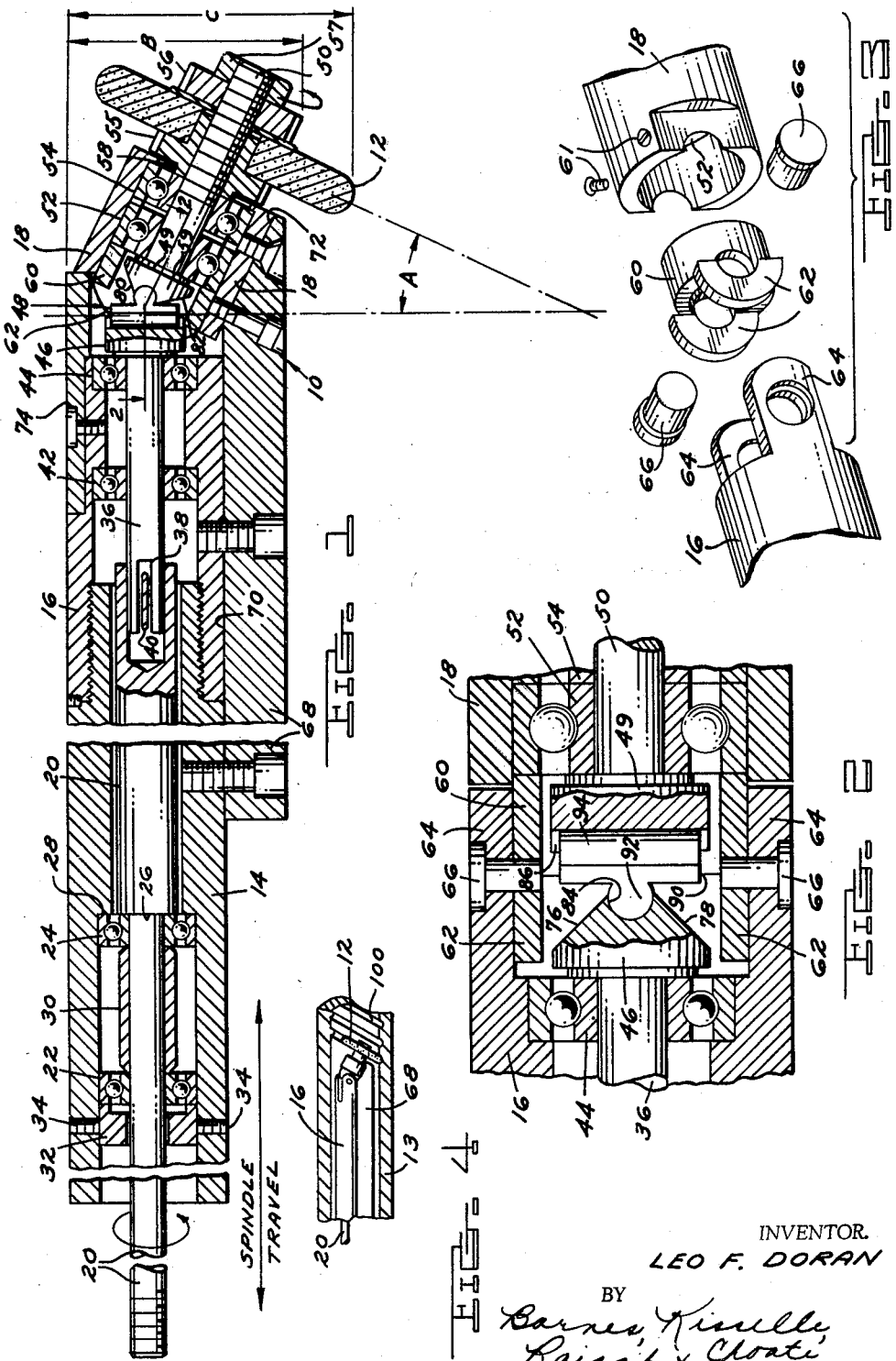

3,128,611
UNIVERSALLY JOINTED SPINDLE
Leo F. Doran, Clawson, Mich., assignor to Beaver Precision Products, Inc., Clawson, Mich., a corporation of Michigan
Filed June 25, 1962, Ser. No. 205,046
2 Claims. (Cl. 64—4)

This invention relates to torque transmitting apparatus, and more particularly to a jointed spindle and a universal joint particularly adapted for use with such a spindle.

An object of the present invention is to provide an improved spindle adapted to rotatably support and drive a rotary tool at an angle with respect to the major axis of the spindle so that a high angle approach may be made to a work surface disposed parallel to the direction of traverse of the spindle.

Another object of the present invention is to provide a spindle of the aforesaid character which is operable at relatively high speeds and is therefore well suited for grinding applications.

A further object is to provide an improved spindle adapted for longitudinal movement in a confined space only slightly larger than the transverse dimension of the spindle, and which rotatably supports and drives a rotary tool about an axis disposed at an angle to the direction of such movement so that high angle cuts may be obtained in internal machining of cylinders, bores and the like.

Still another object of the present invention is to provide an improved spindle of the above character which is easily adjusted to vary the angular disposition of the rotational axis of the rotary tool mounted on the spindle.

An equally important and related object of the present invention is to provide an improved torque transmitting coupling structure operable in the manner of a universal joint and an Oldham coupling for rotatably connecting two angularly intersecting shafts and/or for transmitting uniform angular velocity between parallel shafts whose axes may be out of line.

Another object is to provide an improved universal joint capable of transmitting torque through a relatively large angle at relatively high angular velocity without causing relative angular motion between the driver and follower elements rotatably connected by the universal joint.

Other objects, features and advantages will become apparent in the following description and drawing in which:

FIG. 1 is a fragmentary view of a grinding spindle constructed in accordance with the present invention taken in section along the longitudinal axis of the spindle.

FIG. 2 is an enlarged fragmentary sectional view taken on the line 2—2 of FIG. 1.

FIG. 3 is a fragmentary exploded perspective view illustrating the interconnecting structure of the sleeves of the grinding spindle.

FIG. 4 is a fragmentary elevational view illustrating the grinding spindle being used for grinding internal threads within a cylindrical member.

Referring to FIGS. 1 and 4, an improved spindle assembly 10 in accordance with the present invention rotatably supports at the free end thereof an internal thread grinding wheel 12 which is tilted at an angle A relative to the axial travel of the spindle within the bore of the workpiece 13 being ground. The supporting casing of the spindle comprises a pair of threadably joined co-axial body sleeves 14 and 16 and an angled sleeve 18 supported at the forward end of sleeve 16. In normal use, sleeve 14 is non-rotatably chucked in an appropriate machine tool and the power train thereof is connected to a drive shaft 20 journalled within sleeve 14 by a pair of ball bearings 22 and 24. As will be apparent from the drawing, the provision of shoulder 26 on shaft 20, an internal shoulder 28 in sleeve 14, a bearing spacer sleeve 30, a bearing retaining collar 32 and set screws 34 provide a mounting arrangement for bearings 22, 24 designed to take a combination of radial and thrust loads. Bearings 22, 24 are preloaded by collar 32 to reduce axial deflection under working loads in order to maintain accurate alignment of the spindle elements.

Shaft 20 drives another co-axial shaft 36 via a slip-joint connection comprising slot 38 and radial key 40 received therein, shaft 36 being journalled in sleeve 16 by a pair of ball bearings 42, 44. The forward end of shaft 36 comprises an enlarged cylindrical head 46 which forms part of a universal joint construction 48. Joint 48 also includes an enlarged cylindrical head 49 of a stub shaft 50 which is journalled by a pair of ball bearings 52 and 54 in sleeve 18 so that the rotational axis of shaft 50 is inclined relative to the common rotational axis of shafts 20, 36.

Grinding wheel 12 is secured to shaft 50 for rotation therewith by internally threaded nuts 55, 56 and 57. Bearings 52, 54 are retained and preloaded by a shoulder 58 on nut 55 and by a shoulder 59 on shaft 50. A bushing 60 (FIGS. 1 and 3) is press fitted into the rear end of sleeve 18 and locked therein by screws 61. Bushing 60 has a pair of axially extending semi-circular arms 62 which are slidably received between a pair of arms 64 extending from sleeve 16. Arms 64 and bushing 60 are hinged together by a pair of pivot pins 66 as shown in FIGS. 2 and 3.

Nose sleeve 18 is rigidly connected to sleeves 16 and 14 by a supporting member 68 bolted thereto (FIG. 1). The upper surface 70 of member 68 is concavely recessed for most of its length to fit snugly against the cylindrical sleeves 14 and 16. At the forward end of member 68 the upper surface 72 is concavely recessed to fit snugly against the cylindrical sleeve 18 and is inclined at angle A relative to surface 70 in order to accurately maintain the inclination of sleeve 18 with respect to sleeves 14, 16.

When it is desired to adjust angle A of grinding wheel 12, this is easily accomplished by removing a cover plate 74, and then detaching member 68 from sleeves 14, 16 and 18 and replacing it with a corresponding member having surfaces 70 and 72 disposed at the desired angular relationship. This adjustment does not require disconnection of sleeve 16 from sleeve 18 due to the pivotal connection therebetween provided by pins 66. Nor is it necessary to uncouple stub shaft 50 from drive shaft 36 since the universal joint 48 permits wide angular adjustment therebetween.

Referring now to the details of universal joint 48, each of the shaft heads 46, 49 has the opposite sides 76, 78 and 80 and 82 respectively (FIGS. 2 and 1) ground symmetrically from both sides of the head at an angle preferably about 4 degrees greater than angle A. Heads 46, 74 each have a concave, radially extending recess 84, 86 respectively ground therein to form a socket at the apex of the angled sides of each head.

The universal joint 48 also includes a round disk 90 having on the opposite end faces thereof perpendicularly related and radially extending convex abutments 92 and 94 respectively. The convex radius of abutments 92, 94 closely matches the concave radius of sockets 84, 86 so that the abutments are received with a close sliding fit in their respective sockets for radial movement relative thereto. In addition, abutments 92, 94 are undercut so that the convex form thereof is carried around on each side of the abutment below the radius centerline thereof by an amount equal to the helix angle A. This allows disk 90 to swing about the common pivotal axis of each abutment and socket in either direction from central up to the amount of angle ground on sides 76, 78 and 80, 82 without encountering interference. Disk 90 is thus free to alternately slide radially and pivot angularly during rotation of shafts 36 and 50, the recessed heads 46 and 74 thereof serving as the drive tangs of the universal joint. However, disk 90 cannot escape and hence requires no additional restraining devices. Assembly and disassembly of the joint and spindle are thereby simplified.

Preferably the diameter of disk 90 is smaller than that of heads 46 and 74 to prevent the disk from projecting beyond the diameter of heads 46, 74 as the disk slides radially back and forth in sockets 84 and 86. This difference in diameters is made proportional to the maximum operating angle A and is only necessary when joint 48 is operating in a confined area such as within spindle 10.

In the operation of the above-described grinding spindle and universal joint of the invention, the universal disk 90 due to its floating action runs at a constant speed throughout its angular capabilities. This is in contrast to conventional universal joints which characteristically speed up and slow down twice during each revolution thereof. Two distinct actions take place during each revolution of universal joint 48; (1) disk 90 constantly oscillates to match its two radial tangs 92 and 94 to the tang sockets 84 and 86, and (2) disk 90 constantly slides length-wise in the tang sockets to maintain alignment.

It has been found that the improved universal joint 48 will operate at relatively high speeds as contrasted with conventional universal joints. For example, when incorporated into the improved spindle of the invention, the grinding wheel with angle A set at 26 degrees has been successfuly operated at 10,000 r.p.m.

It will be evident that the improved universal joint 48 is not limited in application to a grinding spindle as disclosed herein but may be used to advantage wherever a universal joint is desirable. However, the universal joint does co-act with the improved grinding spindle 10 to provide high speed, uniform velocity in an angled grinding spindle. In addition, spindle 10 provides a rigid, relatively narrow structure having a transverse dimension B (FIG. 1) which in ane embodiment is only about 1½ inches. When grinding wheel 12 has a diameter of 1¾ inches and angle A is about 26 degrees, the overall transverse dimension C is only about 1¾ inches. It thus will be seen that (FIG. 4) the spindle assembly of the invention is capable of penetrating deep within the confined bore of a workpiece 13 to grind internal threads or grooves 100. Even when used in larger diameter bores than that of workpiece 13 the spindle 10 of the invention is capable of grinding internal threads whose helix angle is greater than that which can be obtained by the use of a conventional straight grinding spindle.

I claim:

1. A spindle assembly comprising a casing, a drive shaft journalled for rotation in said casing, another casing adjoining one end of said first casing, a stub shaft journalled for rotation in said second casing about an axis intersecting the rotational axis of said drive shaft at an oblique angle, a universal joint coupling said shafts so that said drive shaft rotatably drives said stub shaft and means for rigidly interconnecting said casings and maintaining said oblique angle relationship of said shafts, said casing connecting means comprising a connecting member disposed adjacent the exterior of the adjoining ends of said casings, said member having first and second surfaces respectively adjacent the exterior of said first and second casings shaped complemental to the exteriors of the respectively adjacent casings, said surfaces being disposed at a predetermined angle to thereby brace said casings to maintain said shafts therein in said angled relation, and fastening means for detachably securing said connecting member to said casings.

2. The combination set forth in claim 1 wherein said connecting member is mounted adjacent the side of said casings defining the vertex of the angle of intersection of said casings.

References Cited in the file of this patent

UNITED STATES PATENTS

| | | |
|---|---|---|
| 481,780 | Brown | Aug. 30, 1892 |
| 1,170,524 | Fernald | Feb. 8, 1916 |
| 1,398,234 | Landis | Nov. 29, 1921 |
| 1,558,763 | Rossberg | Oct. 27, 1925 |
| 2,462,574 | Wallace | Feb. 22, 1949 |